United States Patent
Jeong

(10) Patent No.: US 8,267,415 B2
(45) Date of Patent: Sep. 18, 2012

(54) SUSPENSION ARM

(75) Inventor: Pil Young Jeong, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 129 days.

(21) Appl. No.: 12/827,599

(22) Filed: Jun. 30, 2010

(65) Prior Publication Data

US 2011/0133425 A1    Jun. 9, 2011

(30) Foreign Application Priority Data

Dec. 4, 2009  (KR) .................. 10-2009-0120134

(51) Int. Cl.
    *B60G 99/00*    (2010.01)
(52) U.S. Cl. .............. 280/124.133; 428/133; 428/597; 29/527.1
(58) Field of Classification Search ........... 280/124.128, 280/124.133, 124.134, 124.153, 124.116, 280/781; 74/579 R, 588; 428/98, 131, 133, 428/137, 594, 596, 597; 52/309.1, 834, 846, 52/847; 29/505, 509, 527.1
See application file for complete search history.

(56) References Cited

U.S. PATENT DOCUMENTS

| | | | | |
|---|---|---|---|---|
| 2,746,141 | A * | 5/1956 | Hobrock | 228/151 |
| 4,172,590 | A * | 10/1979 | Jarret et al. | 267/149 |
| 4,509,774 | A * | 4/1985 | Booher | 280/124.134 |
| 4,658,502 | A * | 4/1987 | Eckold et al. | 29/798 |
| 4,688,316 | A * | 8/1987 | La Barge et al. | 29/432 |
| 4,760,634 | A * | 8/1988 | Rapp | 29/509 |
| 4,772,044 | A * | 9/1988 | Booher | 280/124.134 |
| 4,831,711 | A * | 5/1989 | Rapp | 29/509 |
| 5,155,897 | A * | 10/1992 | Schleicher | 29/509 |
| 5,165,306 | A * | 11/1992 | Hellon | 74/588 |
| 5,213,008 | A * | 5/1993 | Kanno et al. | 74/579 R |
| 5,263,557 | A * | 11/1993 | Grzesiak | 188/250 H |
| 5,313,697 | A * | 5/1994 | Kanno et al. | 29/527.4 |
| 5,358,210 | A * | 10/1994 | Simon et al. | 248/628 |
| 5,662,349 | A * | 9/1997 | Hasshi et al. | 280/124.134 |
| 5,720,144 | A * | 2/1998 | Knudson et al. | 52/481.1 |
| 5,798,185 | A * | 8/1998 | Kato | 428/582 |
| 5,885,688 | A | 3/1999 | McLaughlin | |
| 6,029,987 | A * | 2/2000 | Hoffman et al. | 280/124.171 |
| 6,152,433 | A * | 11/2000 | Hettich et al. | 267/188 |
| 6,250,657 | B1 * | 6/2001 | Valin et al. | 280/124.1 |
| 6,324,940 | B1 * | 12/2001 | Pazdirek et al. | 74/579 R |
| 6,811,169 | B2 * | 11/2004 | Schroeder et al. | 280/124.171 |
| 6,905,129 | B2 * | 6/2005 | Runte et al. | 280/124.134 |
| 6,913,273 | B2 * | 7/2005 | Drabon et al. | 280/93.502 |

(Continued)

FOREIGN PATENT DOCUMENTS

JP    5-147416 A    6/1993

(Continued)

*Primary Examiner* — Joseph Rocca
*Assistant Examiner* — Barry Gooden, Jr.
(74) *Attorney, Agent, or Firm* — Morgan, Lewis & Bockius LLP

(57) ABSTRACT

A suspension arm may include first and second metal housings, a metal connecting portion including first and second panels, wherein the metal connecting portion connects the first and second metal housings at distal ends thereof respectively, and wherein a burred first panel connecting portion and a burred second panel connecting portion are formed respectively to the first and second panels, and a reinforcement member wrapping the first and second metal housings and the metal connecting portion, wherein the first panel and the second panel are connected by inserting the burred second panel connecting portion into the burred first panel connecting portion.

14 Claims, 7 Drawing Sheets

U.S. PATENT DOCUMENTS

| | | | |
|---|---|---|---|
| 7,032,624 B2 * | 4/2006 | Bruske et al. | 139/57 |
| 7,159,880 B2 | 1/2007 | Budde et al. | |
| 7,360,470 B2 * | 4/2008 | Bonner | 74/594.1 |
| 7,926,761 B2 * | 4/2011 | Coupe et al. | 244/102 R |
| 7,996,977 B2 * | 8/2011 | Herb | 29/432.2 |
| 2002/0153689 A1 * | 10/2002 | Schroeder et al. | 280/124.134 |
| 2003/0014935 A1 * | 1/2003 | Bodnar | 52/481.1 |
| 2003/0034625 A1 * | 2/2003 | Runte et al. | 280/124.134 |
| 2003/0087117 A1 * | 5/2003 | Duley et al. | 428/594 |
| 2003/0122339 A1 * | 7/2003 | Drabon et al. | 280/124.134 |
| 2005/0056117 A1 * | 3/2005 | Jones | 74/579 R |
| 2006/0213050 A1 * | 9/2006 | Herb | 29/515 |
| 2009/0001681 A1 * | 1/2009 | Morales Arnaez | 280/124.134 |
| 2009/0315291 A1 * | 12/2009 | D'Aponte et al. | 280/124.128 |
| 2010/0009211 A1 * | 1/2010 | Tsai | 428/596 |

FOREIGN PATENT DOCUMENTS

| | | |
|---|---|---|
| JP | 10-109511 A | 4/1998 |
| JP | 2001-105090 A | 4/2001 |
| JP | 2004-224246 A | 8/2004 |
| JP | 2004-284471 A | 10/2004 |
| WO | WO 03/039893 A1 | 5/2003 |
| WO | WO 03/042023 A1 | 5/2003 |

* cited by examiner

SUSPENSION ARM

CROSS-REFERENCE TO RELATED APPLICATION

The present application claims priority to Korean Patent Application No. 10-2009-0120134 filed in the Korean Intellectual Property Office on Dec. 4, 2009, the entire contents of which is incorporated herein for all purposes by this reference.

BACKGROUND OF THE INVENTION

1. Field of the Invention

The present invention relates to a suspension system for a vehicle. More particularly, the present invention relates to a suspension arm made of metal and synthetic resin material.

2. Description of Related Art

Generally, a suspension system for a vehicle includes a chassis spring, which connects a vehicle body and an axle and relieves impacts transmitted from ground, a shock absorber, which is designed to smooth out or damp shock impulse, and dissipate kinetic energy, and a stabilizer, which relieves oscillation of a vehicle.

A suspension system may be divided into a front suspension system and a rear suspension system according to mounting position, and the front suspension system connects a frame and an axle to support a vehicle body, absorbs impact of wheels and simultaneously a parts of a steering is mounted thereof.

The front suspension system is mainly divided into a rigid axle suspension and an independent suspension, and recently the independent suspension has been primarily used for a passenger car, and the rigid axle suspension has been used for a heavy vehicle such as a bus or a truck.

The independent suspension is mainly divided into a Wish Bone type and a Strut or Mcpherson Type, and each wheel of the independent suspension is attached to the frame independently, so that a road bump affecting one wheel has no effect on the others.

A suspension system, so called a control arm, is one of main element in the suspension system and connects wheels, braking system and so on to the vehicle body.

The suspension arm requires high rigidity against vibration and lightweight so that materials for the suspension arm are changed from steel to aluminum or plastic and also the suspension arm with high rigidity and lightweight is not cost competitive.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a suspension arm with high rigidity and lightweight at a competitive price.

In an aspect of the present invention, the suspension arm may include first and second metal housings, a metal connecting portion including first and second panels, wherein the metal connecting portion connects the first and second metal housings at distal ends thereof respectively, and wherein a burred first panel connecting portion and a burred second panel connecting portion are formed respectively to the first and second panels, and a reinforcement member wrapping the first and second metal housings and the metal connecting portion, wherein the first panel and the second panel are connected by inserting the burred second panel connecting portion into the burred first panel connecting portion.

The reinforcement member may be made up of synthetic resin material.

The reinforcement member may be integrally formed together with the first and second metal housings and the metal connecting portion through an insert injection molding process after connecting the first and second metal housings and the metal connecting portion.

A connecting portion reinforcement protrude may be formed to the reinforcement member and reinforces a portion where the burred first panel connecting portion and the burred second panel connecting portion are connected with each other.

The first and second panels may respectively include a joining portion in which the first and second panels contact each other, and a reinforcement portion bent from the joining portion, wherein the respective reinforcement portion of the first and second panels is bent from the respective joining portion in opposite direction, wherein an end of the reinforcement portion is bent for enhancing rigidity and coupling force, and wherein the burred first panel connecting portion and the burred second panel connecting portion are formed to the respective joining portion of the first and second panels.

In another exemplary embodiment of the present invention, the suspension arm may include a connecting annulus formed to the distal ends of the metal connecting portion and the first and second metal housing are inserted therein respectively.

The first and second panels of the metal connecting portion may include a connecting annulus at the both distal ends thereof each other and the first and second housings may be inserted in the respective annulus at the both distal ends of the first and second panels.

The reinforcement member may be integrally formed together with the first and second metal housings and the metal connecting portion through an insert injection molding process after connecting the first and second metal housing, the connecting annulus and the metal connecting portion.

As described above, a suspension arm according to an exemplary embodiment of the present invention may have high rigidity and lightweight at a competitive price.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
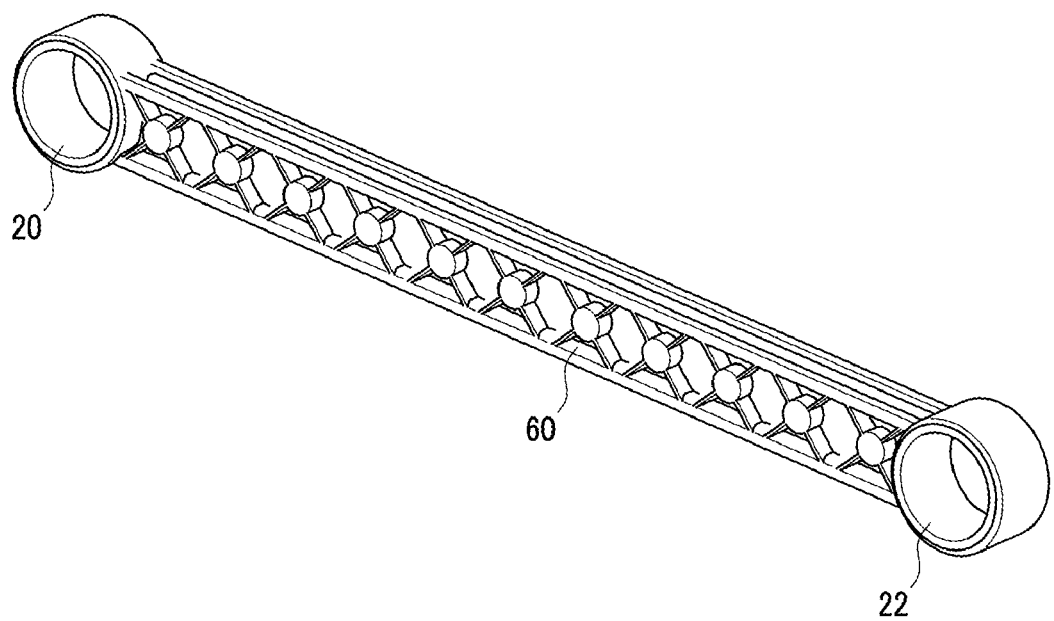
FIG. 1 is a perspective view of an exemplary suspension arm according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Figure 2:
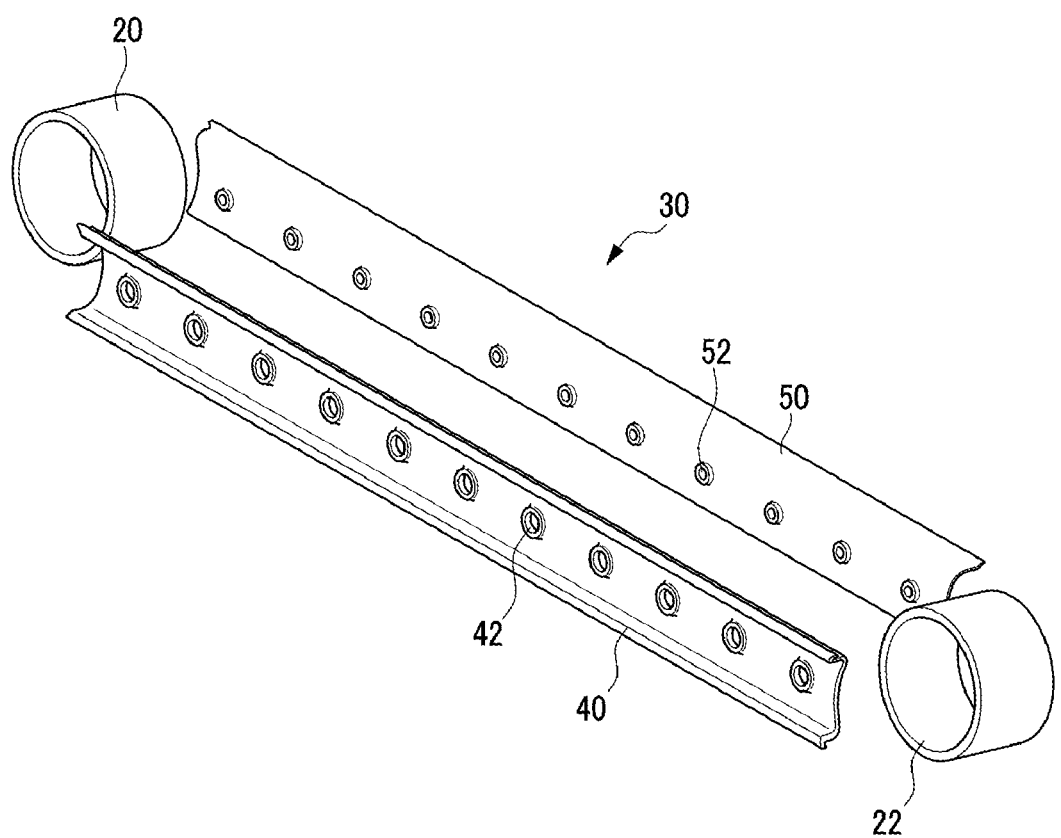
FIG. 2 is an exploded view of a metal portion of an exemplary suspension arm according to the present invention.
Figure 3:
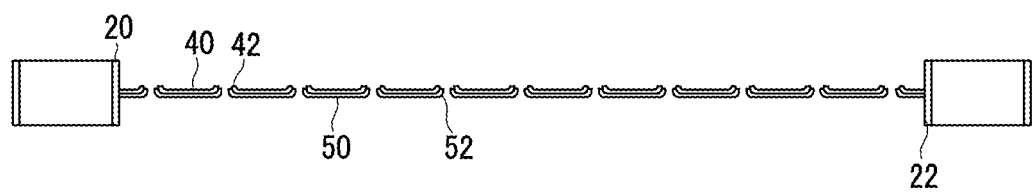
FIG. 3 is a cross-sectional view of a metal portion of an exemplary suspension arm according to the present invention.

FIG. 1 is a perspective view of a suspension arm according to the first exemplary embodiment of the present invention, FIG. 2 is an exploded view of a metal portion of the suspension arm according to the first exemplary embodiment of the present invention and FIG. 3 is a cross-sectional view of a metal portion of the suspension arm according to the first exemplary embodiment of the present invention.

Figure 4:
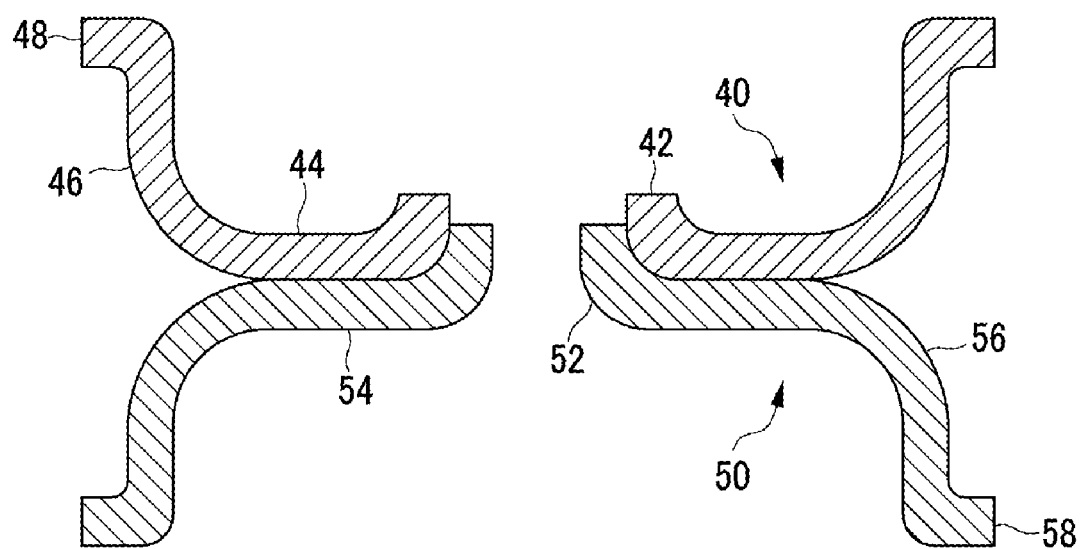
FIG. 4 is a cross-sectional view of a panel connecting portion in an exemplary suspension arm according to the present invention.
Figure 5:
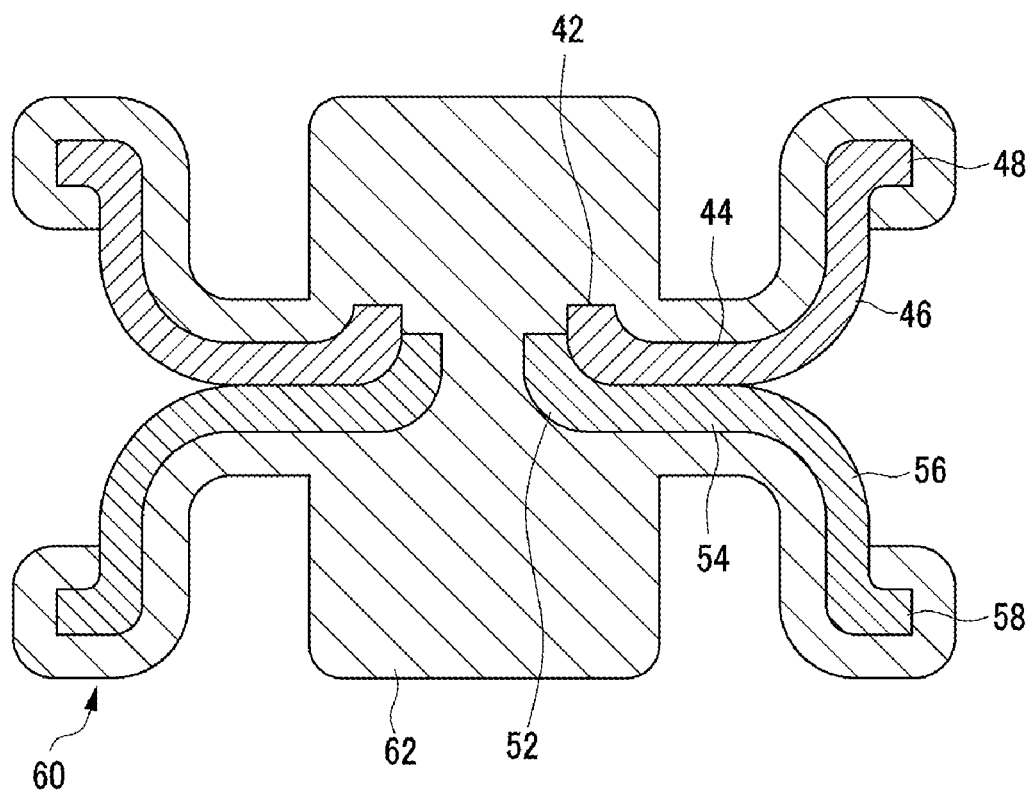
FIG. 5 is a cross-sectional view of a panel connecting portion including a reinforcement member of an exemplary suspension arm according to the present invention.

FIG. 4 is a cross-sectional view of a panel connecting portion according to the first exemplary embodiment of the present invention and FIG. 5 is a cross-sectional view of a panel connecting portion including a reinforcement member according to the first exemplary embodiment of the present invention.

Referring to FIG. 1 to FIG. 5, a suspension arm according to the first embodiment of the present invention includes first and second metal housings 20 and 22, a metal connecting portion 30 including first and second panels 40 and 50, connecting the first and second metal housings 20 and 22, which a burred first panel connecting portion 42 and a burred second panel connecting portion 52 are formed thereof respectively, a reinforcement member 60, made of synthetic resin material, wrapping the first and second metal housings 20 and 22 and the metal connecting portion 30, wherein the first panel 40 and the second panel 50 are connected by inserting the second panel connecting portion 52 into the first panel connecting portion 42.

The first and second metal housings 20 and 22 are a ball housing and a bush housing respectively, and is connected to a knuckle, a carrier or a vehicle body.

The burred second panel connecting portion 52 is forcefully inserted into the first panel connecting portion 42, so that coupling force can be enhanced. And welding processes can be reduced or eliminated so that the manufacturing process is reduced.

The reinforcement member 60 is integrally formed together through an insert injection molding process after connecting the first and second metal housings 20 and 22 and the metal connecting portion 30.

And thus, the first and second metal housings 20 and 22, the metal connecting portion 30 and the reinforcement member 60 are made by different materials, so that total weight of the suspension arm can be reduced and high rigidity can be realized at a competitive price.

A connecting portion reinforcement protrude 62 is formed to the reinforcement member 60 for reinforcing a portion where the first panel connecting portion 42 and the second panel connecting portion 52 are connected with.

The first and second panels 40 and 50 include a joining portion 44 and 54 respectively that each panel 40 and 50 contacts and reinforcement portions 46 and 56 that are bent formed from the joining portions 44 and 54 so that buckling of the metal connecting portion 30 can be prevented.

Ends 48 and 58 the reinforcement portion 46 and 56 are bent for enhancing rigidity and coupling force.

Figure 6:
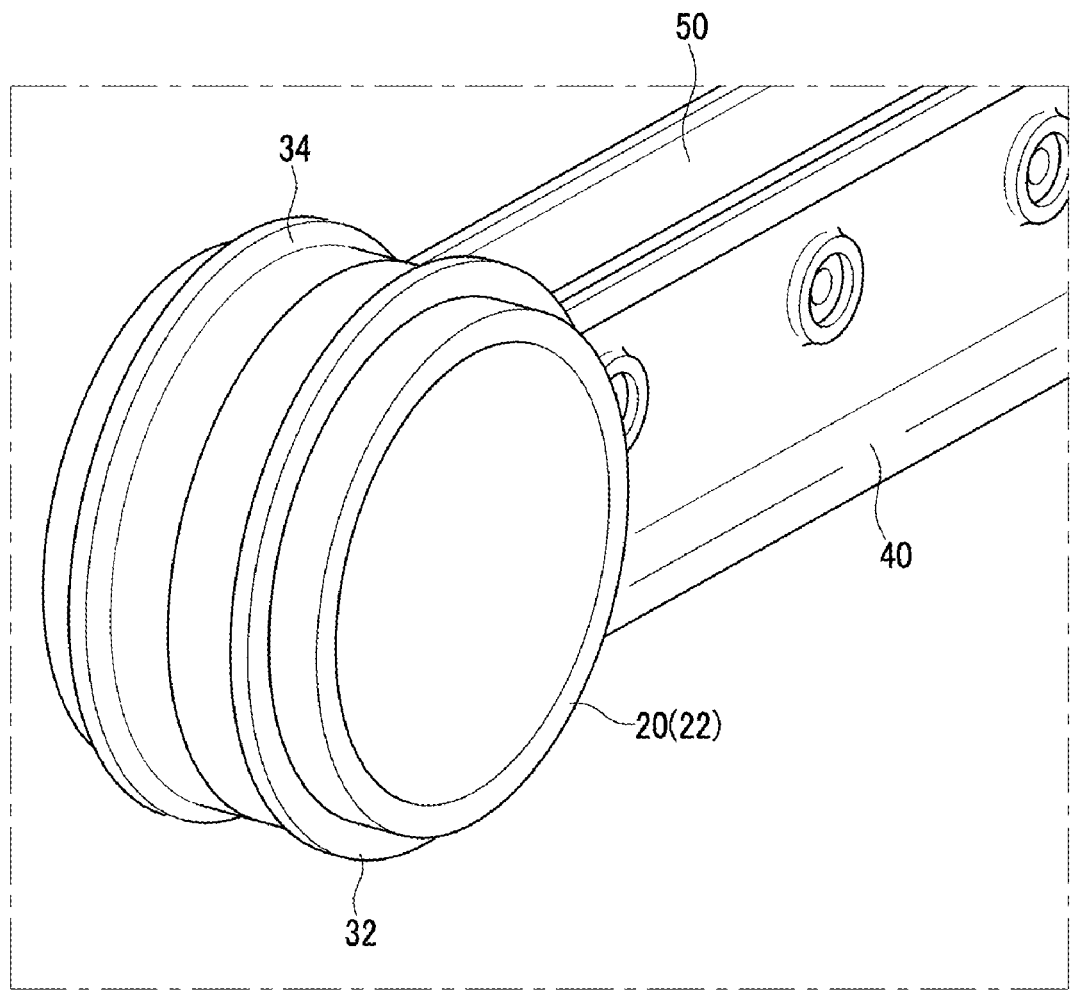
FIG. 6 is a perspective view of a metal housing in an exemplary suspension arm according to the present invention.
Figure 7:
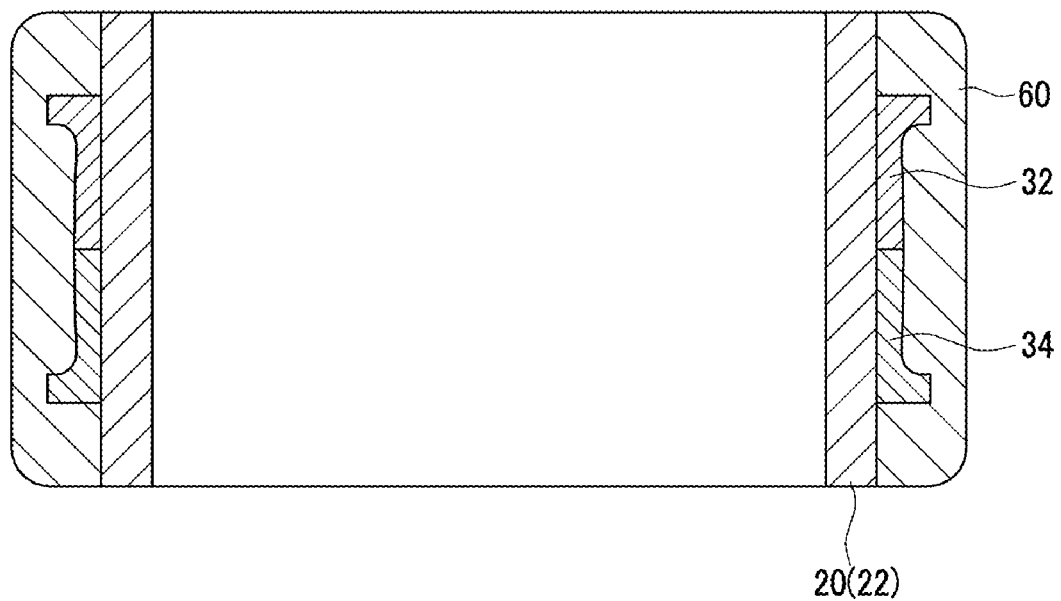
FIG. 7 is a cross-sectional view of a metal housing including a reinforcement member in an exemplary suspension arm according the present invention.

FIG. 6 is a perspective view of a metal housing according to the second exemplary embodiment of the present invention and FIG. 7 is a cross-sectional view of a metal housing including a reinforcement member according to the second exemplary embodiment of the present invention.

Referring to FIG. 6 and FIG. 7, a suspension arm according to the second exemplary embodiment of the present invention includes connecting annuli 32 and 34 that are formed to distal ends of the metal connecting portion 30 and the first and second metal housings 20 and 22 are inserted therein.

The reinforcement member 60 is integrally formed together through an insert injection molding process after connecting the first and second metal housings 20 and 22, the connecting annuli 32 and 34 and the metal connecting portion 30.

The first and second metal housings 20 and 22 are forcefully inserted into the connecting annulus 32 and 34. And thus during coupling the first and second metal housings 20 and 22 and the connecting portion 30, welding processes can be reduced or eliminated so that the manufacturing process is reduced and coupling force of the first and second panels 40 and 50 can be enhanced.

Except for the metal ball housing 20 and the connecting annuli 32 and 34, the suspension arm according to the second exemplary embodiment of the present invention is similar to the suspension arm according to the first exemplary embodiment of the present invention so that detailed description will be omitted.

As described above, the suspension arm according to the exemplary embodiments of the present invention may have high rigidity and lightweight at a competitive price.

For convenience in explanation and accurate definition in the appended claims, the terms "upper", "lower," "inner," and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A suspension arm comprising:
   first and second metal housings;
   a metal connecting portion including first and second panels, wherein the metal connecting portion connects the first and the second metal housings at distal ends thereof respectively, and wherein a burred first panel connecting portion and a burred second panel connecting portion are formed respectively on the first and the second panels; and
   a reinforcement member wrapping the first and the second metal housings and the metal connecting portion,
   wherein the first panel and the second panel are connected by inserting the burred second panel connecting portion into the burred first panel connecting portion;
   wherein a connecting annulus is formed on the distal ends of the metal connecting portion and the first and the second metal housing are inserted therein respectively; and
   wherein the reinforcement member is integrally formed together with the first and the second metal housings and the metal connecting portion through an insert injection molding process after connecting the first and the second metal housing, the connecting annulus and the metal connecting portion.

2. The suspension arm of claim 1, wherein the reinforcement member is made up of synthetic resin material.

3. The suspension arm of claim 1, wherein the reinforcement member is integrally formed together with the first and the second metal housings and the metal connecting portion through an insert injection molding process after connecting the first and the second metal housings and the metal connecting portion.

4. The suspension arm of claim 1, wherein a connecting portion reinforcement protrude is formed on the reinforcement member and reinforces a portion where the burred first panel connecting portion and the burred second panel connecting portion are connected with each other.

5. The suspension arm of claim 1, wherein the first and the second panels of the metal connecting portion include a connecting annulus at the distal ends thereof and the first and the second housings are inserted in the respective annulus at the distal ends of the first and the second panels.

6. The suspension arm of claim 1, wherein a connecting portion reinforcement protrude is formed on the reinforcement member and reinforces a portion where the first panel connecting portion and the second panel connecting portion are connected with each other.

7. The suspension arm of claim 1, wherein the first and the second panels respectively comprise:
   a joining portion in which the first and the second panels contact each other; and
   a reinforcement portion bent from the joining portion.

8. The suspension arm of claim 7, wherein the respective reinforcement portion of the first and the second panels is bent from the respective joining portion in opposite directions.

9. The suspension arm of claim 7, wherein an end of the reinforcement portion is bent for enhancing rigidity and coupling force.

10. The suspension arm of claim 7, wherein the burred first panel connecting portion and the burred second panel connecting portion are formed on the respective joining portion of the first and the second panels.

11. The suspension arm of claim 1, wherein the first and the second panels respectively comprise:
    a joining portion in which the first and the second panels contact each other; and
    a reinforcement portion bent from the joining portion.

12. The suspension arm of claim 11, wherein the respective reinforcement portions of the first and the second panels is bent from the respective joining portion in opposite direction.

13. The suspension arm of claim 11, wherein an end of the reinforcement portion is bent for enhancing rigidity and coupling force.

14. The suspension arm of claim 11, wherein the burred first panel connecting portion and the burred second panel connecting portion are formed on the respective joining portions of the first and the second panels.

* * * * *